`US007792411B2`

(12) United States Patent
Hirabayashi et al.

(10) Patent No.: US 7,792,411 B2
(45) Date of Patent: Sep. 7, 2010

(54) FILE PROCESSING DEVICE, FILE PROCESSING METHOD, PROGRAM OF FILE PROCESSING METHOD, RECORDING MEDIUM ON WHICH PROGRAM OF FILE PROCESSING METHOD IS RECORDED, AND IMAGING DEVICE AND RECORDING MEDIUM ON WHICH FILE IS RECORDED

(75) Inventors: Mitsuhiro Hirabayashi, Tokyo (JP); Makoto Yamada, Tokyo (JP); Fumitaka Kawate, Kanagawa (JP)

(73) Assignee: Sony Corporation, Tokyo (JP)

( * ) Notice: Subject to any disclaimer, the term of this patent is extended or adjusted under 35 U.S.C. 154(b) by 954 days.

(21) Appl. No.: 10/595,522

(22) PCT Filed: Oct. 7, 2004

(86) PCT No.: PCT/JP2004/015206

§ 371 (c)(1),
(2), (4) Date: May 18, 2006

(87) PCT Pub. No.: WO2005/041187

PCT Pub. Date: May 6, 2005

(65) Prior Publication Data

US 2007/0014219 A1 Jan. 18, 2007

(30) Foreign Application Priority Data

Oct. 29, 2003 (JP) .......................... P2003-368818

(51) Int. Cl.
*G11B 27/00* (2006.01)
*H04N 5/93* (2006.01)
*H04N 5/91* (2006.01)
*H04N 7/00* (2006.01)

(52) U.S. Cl. .............................. 386/52; 386/46; 386/83
(58) Field of Classification Search .................... 386/1, 386/46, 52, 96, 98, 104–106, 124–126
See application file for complete search history.

(56) References Cited

U.S. PATENT DOCUMENTS

| 6,580,872 | B1 | 6/2003 | Kikuchi | |
|---|---|---|---|---|
| 7,130,525 | B1 * | 10/2006 | Iwano | 386/53 |
| 7,292,781 | B1 * | 11/2007 | Ito et al. | 386/96 |

(Continued)

FOREIGN PATENT DOCUMENTS

EP 0 295 148 A1 12/1988

(Continued)

OTHER PUBLICATIONS

Australian Patent Office Written Opinion and Search Report dated Mar. 2, 2007.

*Primary Examiner*—Marsha D Banks Harold
*Assistant Examiner*—Marc Dazenski
(74) *Attorney, Agent, or Firm*—K&L Gates LLP

(57) ABSTRACT

The present invention is applied to an imaging device for recording, for example, a result of imaging on an optical disc by a QuickTime file format and forms an real data block by allocating management information for managing a specific region recorded by interleave processing, and the specific region is managed by the management information and a management information block.

23 Claims, 8 Drawing Sheets

U.S. PATENT DOCUMENTS

2003/0133695 A1  7/2003  Hirabayashi et al.

FOREIGN PATENT DOCUMENTS

| | | |
|---|---|---|
| EP | 1 030 307 A1 | 5/2000 |
| EP | 1 052 644 A1 | 11/2000 |
| EP | 1 126 454 A1 | 8/2001 |
| EP | 1 206 135 A1 | 5/2002 |
| JP | 1992175081 | 6/1993 |
| JP | 11-120044 | 4/1999 |
| JP | 2001-076433 | 3/2001 |
| JP | 2002281443 | 9/2002 |
| JP | 2002-373480 | 12/2002 |
| JP | 2003-022621 | 1/2003 |
| JP | 2003-22621 | 1/2003 |
| JP | 2003022621 | 1/2003 |
| JP | 2003-168284 | 6/2003 |
| WO | 03/046912 A1 | 6/2003 |

\* cited by examiner

FIG. 8

| Record Unit Sample Data | size (bytes) |
|---|---|
| Record Unit Sample{ | |
|    Post recording Area size | 4 |
|    number of entries | 2 |
| | |
|    Post recording Area Info{ | |
|       Track-ID | 4 |
|       Sample-index | 4 |
|       Sample-count | 4 |
|       Referred-counter | 2 |
|    } | |
| } | |

}DCC

FIG. 9

| field | Track-id | Sample-index | Sample-count | Referred-counter |
|---|---|---|---|---|
| Record Unit Sample 1 | 3 | 1 | 1 | 0 |

FIG. 10

| field | Track-id | Sample-index | Sample-count | Referred-counter |
|---|---|---|---|---|
| Record Unit Sample 1 | 4 | 1 | N | 1 |
| | 3 | 1 | 1 | 0 |
| Record Unit Sample 2 | 3 | 2 | 1 | 0 |

FILE PROCESSING DEVICE, FILE PROCESSING METHOD, PROGRAM OF FILE PROCESSING METHOD, RECORDING MEDIUM ON WHICH PROGRAM OF FILE PROCESSING METHOD IS RECORDED, AND IMAGING DEVICE AND RECORDING MEDIUM ON WHICH FILE IS RECORDED

CROSS REFERENCE TO RELATED APPLICATIONS

The present application claims priority to Japanese Patent Document No. P2003-368818 filed on Oct. 29, 2003, the disclosure of which is herein incorporated by reference.

BACKGROUND

The present invention relates to a file processing device, a file processing method, a program of the file processing method, a recording medium on which the program of the file processing method is recorded, and an imaging device and recording medium on which a file is recorded and can be applied to an imaging device for recording a result of imaging by, for example, a QuickTime file format (hereinafter, referred to as QT file). The present invention allocates management information for managing a specific region recorded by interleave processing and the specific region is managed by the management information and a management information block, thereby the specific region recorded by interleave processing can be more minutely managed than ever.

Heretofore, a QT file is widely known as a file format corresponding to multimedia. The QT file is a file format generated as an expanded function of an OS (Operating System) for reproducing a motion image and the like without using a special hardware construction and is a time-base multimedia file format that can reproduce real data in various formats such a motion image, an audio sound, a still image, a text, MIDI and the like by synchronizing them along a single time base.

In the QT file, the real data such as the motion image, still image, audio sound, and the like are integrated and arranged as a block, and further management information for managing the real data are integrated and made to a block, in addition to the real data block. In the following description, these blocks are called atoms. The respective atoms of the real data and the management information are further divided into blocks by a hierarchical structure. In the real data, respective real data as media data are stored as individual tracks, and, in the QT file, the tracks of the real data of the motion image, the still image, and the text are called a video track, a sound track (audio track), and a text track, respectively.

In the QT file, the real data composed of these tracks are recorded on a recording medium in a chunk unit by interleave processing. Note that the chunk is a unit of handling formed of one or a plurality of samples set to the respective real data.

In contrast, in the atom of the management information, a track atom, which is a track composed of the management information, is formed to each of the real data in correspondence to the track composed of each real data, and management information regarding a chunk and a sample set to corresponding real data is allocated to a lower hierarchical sample table atom of the track atom.

As to the QT file arranged as described above, Japanese Unexamined Patent Application Publication No. 2002-281443 proposes to secure post recording regions by allocating region securing dummy data to one of the real data recorded by interleave processing as describe above as well as to set an identifier of the post recording region and an identifier for identifying whether or not the post recording region is used to a track atom corresponding to the real data and to other track atom.

According to the method, when post record processing is carried out using the post recording regions secured as described above, post recording can be carried out continuously and a result of post recording can be reproduced continuously while omitting seek processing frequently carried out in a disc device. Further, these regions can be simply managed by the identifier provided with the track atoms.

However, there is a possibility that only a part of the post recording regions is used regardless that they are secured for post recording. Thus, it is contemplated that when remaining space regions can be used, wasteful consumption of the regions of a recording medium can be prevented and the regions can be conveniently utilized for another post recording and the like.

However, to detect the remaining space regions in a conventional QT file, it is necessary to confirm the remaining space regions by actually reproducing the tracks in the regions secured for post recording. The post recording regions are not managed sufficiently depending on conventional methods, from which a problem arises in that the post recording regions cannot be reused.

Further, it is also contemplated to delete post recording data from the post recording regions and to record data therein again. However, when the post recording data is externally referred to by other file, the contents of the other file are also changed by deleting and recording data. Accordingly, in this case, a reference relation of all the files recorded on a recording medium must be analyzed again. In the conventional method, the reference relation in the post recording regions is not managed sufficiently, from which a problem also arises in that the regions prepared for post recording cannot be reused.

Accordingly, it is contemplated that when the specific regions recorded by interleave processing can be more minutely managed, post recording regions can be simply reused by securing them by allocating region securing dummy data to one of the real data and carrying out post recording using the regions.

SUMMARY

The present invention, which was made in view of the above points, intends to propose a file processing device, a file processing method, a program of the file processing method, a recording medium on which the program of the file processing method is recorded, and an imaging device and a recording medium on which a file is recorded so that specific regions recorded by interleave processing can be more minutely managed than ever.

To solve the above problem, the present invention is applied to a file processing device for recording a file which has a format in which a plurality of real data are allocated and is formed of an real data block, in which the real data are integrated, and a management information block, in which a plurality of management information of the real data including at least information necessary to reproduce the real data allocated to the real data block are integrated in a hierarchical structure, on a recording medium, thereby the real data block is recorded on the recording medium by intermittently reserving initial regions composed of free-space regions on the recording medium and recording management information of the initial regions regarding allocation to the real data for managing each of the initial regions after the real data are recorded, and the management information block is recorded on the recording medium by recording a lower hierarchical block of management information corresponding to each of the real data and a lower hierarchical block composed of management information regarding the free-space regions in the initial regions which correspond to the above lower hierarchical block.

With the arrangement of the present invention, when the real data block is recorded on the recording medium by intermittently reserving initial regions composed of free-space regions on the recording medium and by recording management information of the initial regions regarding allocation to the real data for managing each of the initial regions after the real data are recorded, and the management information block is recorded on the recording medium by recording a lower hierarchical block of management information corresponding to each of the real data and a lower hierarchical block composed of management information regarding the free-space regions in the initial regions which correspond to the above lower hierarchical block by applying the present invention to the file processing device for recording the file which has the format, in which the plurality of real data are allocated, and is formed of the real data block, in which the real data are integrated, and the management information block, in which a plurality of management information of the real data including at least the information necessary to reproduce the real data allocated to the real data block are integrated in the hierarchical structure, on the recording medium, the initial regions can be managed by the management information of the initial regions regarding the allocation to the real data side in addition to that they are managed by the management information block. Accordingly, the specific regions regarding the initial regions can be more minutely managed than ever, and the space regions can be reused by being used for post recording.

Further, the present invention is applied to a file processing device for recording a file which is formed of an real data block, in which a plurality of real data are integrated, and a management information block, in which a plurality of management information of the real data including at least information necessary to reproduce the real data allocated to the real data block are integrated in a hierarchical structure, on a recording medium, thereby the real data block is recorded on the recording medium by sequentially, cyclically, and repeatedly recording the plurality of real data as well as by recording management information regarding allocation to the real data side for managing predetermined real data continuously recorded on the recording medium.

With the arrangement of the present invention, when the real data block is recorded on the recording medium by sequentially, cyclically, and repeatedly recording the plurality of real data as well as by recording the management information regarding the allocation to the real data side for managing the predetermined real data continuously recorded on the recording medium by applying the present invention to the file processing device for recording the file which is formed of the real data block, in which a plurality of real data are integrated, and the management information block, in which the plurality of management information of the real data including at least the information necessary to reproduce the real data allocated to the real data block are integrated in the hierarchical structure, on the recording medium, the initial regions can be managed by the management information regarding the allocation to the real data side in addition to that they are managed by the management information block. Accordingly, specific regions regarding the real data can be more minutely controlled than ever.

Further, the present invention is applied to a file processing method of recording a file which has a format in which a plurality of real data are allocated and is formed of an real data block, in which the real data are integrated, and a management information block, in which a plurality of management information of the real data including at least information necessary to reproduce the real data allocated to the real data block are integrated in a hierarchical structure, on a recording medium, thereby the real data block is recorded on the recording medium by intermittently reserving initial regions composed of free-space regions on the recording medium and recording management information of the initial regions regarding allocation to the real data for managing each of the initial regions after the real data are recorded, and the management information block is recorded on the recording medium by recording a lower hierarchical block of management information corresponding to each of the real data and a lower hierarchical block composed of management information regarding the free-space regions in the initial regions which correspond to the above lower hierarchical block.

Further, the present invention is applied to a file processing method of recording a file formed of an real data block, in which a plurality of real data are integrated, and a management information block, in which a plurality of management information of the real data including at least information necessary to reproduce the real data allocated to the real data block are integrated in a hierarchical structure, on a recording medium, thereby the real data block is recorded on the recording medium by sequentially, cyclically, and repeatedly recording the plurality of real data as well as by recording management information regarding allocation to the real data side for managing predetermined real data continuously recorded on the recording medium.

Therefore, according to the arrangements of the present invention, there can be provided the file processing methods which can manage the specific regions recorded by interleave processing more minutely than ever.

Further, the present invention is applied to a program of a file processing method of recording a file which has a format in which a plurality of real data are allocated and is formed of an real data block, in which the real data are integrated, and a management information block, in which a plurality of management information of the real data including at least information necessary to reproduce the real data allocated to the real data block are integrated in a hierarchical structure, on a recording medium by causing a computer to carry out a predetermined processing procedure, wherein the processing procedure includes a step of recording the real data block on the recording medium by intermittently reserving initial regions composed of free-space regions on the recording medium and recording management information of the initial regions regarding allocation to the real data for managing each of the initial regions after the real data are recorded, and a step of recording the management information block on the recording medium by recording a lower hierarchical block of management information corresponding to each of the real data and a lower hierarchical block composed of management information regarding the free-space regions in the initial regions which correspond to the above lower hierarchical block.

Further, the present invention is applied to a program of a file processing method of recording a file formed of an real data block, in which a plurality of real data are integrated, and a management information block, in which a plurality of management information of the real data including at least information necessary to reproduce the real data allocated to the real data block are integrated in a hierarchical structure, on a recording medium by causing a computer to carry out a predetermined processing procedure, wherein the processing procedure includes a step of recording the real data block on the recording medium by sequentially, cyclically, and repeatedly recording the plurality of real data as well as by recording management information regarding allocation to the real data side for managing predetermined real data continuously recorded on the recording medium.

Therefore, according to the arrangements of the present invention, there can be provided the programs of the file processing methods which can manage the specific regions recorded by interleave processing more minutely than ever.

Further, the present invention is applied to a recording medium having a program of a file processing method recorded thereon to record a file which has a format in which a plurality of real data are allocated and is formed of an real data block, in which the real data are integrated, and a management information block, in which a plurality of management information of the real data including at least information necessary to reproduce the real data allocated to the real data block are integrated in a hierarchical structure, on the recording medium by causing a computer to carry out a predetermined processing procedure, wherein the processing procedure includes a step of recording the real data block on the recording medium by intermittently reserving initial regions composed of free-space regions on the recording medium and recording management information of the initial regions regarding allocation to the real data for managing each of the initial regions after the real data are recorded, and a step of recording the management information block on the recording medium by recording a lower hierarchical block of management information corresponding to each of the real data and a lower hierarchical block composed of management information regarding the free-space regions in the initial regions which correspond to the above lower hierarchical block.

Further, the present invention is applied to a recording medium having a program of a file processing method recorded thereon to record a file formed of an real data block, in which a plurality of real data are integrated, and a management information block, in which a plurality of management information of the real data including at least information necessary to reproduce the real data allocated to the real data block are integrated in a hierarchical structure, on the recording medium by causing a computer to carry out a predetermined processing procedure, wherein the processing procedure includes a step of recording the real data block on the recording medium by sequentially, cyclically, and repeatedly recording the plurality of real data as well as by recording management information regarding allocation to the real data side for managing predetermined real data continuously recorded on the recording medium.

Therefore, according to the arrangements of the present invention, there can be provided the recording mediums on which the programs of the file processing methods are recorded and which can manage the specific regions recorded by interleave processing more minutely than ever.

Further, the present invention is applied to an imaging device for recording real data composed of video data and sound data obtained as a result of imaging on a recording medium, wherein the real data composed of the video data and the sound data are recorded on the recording medium by recording an real data block in which the real data are integrated on the recording medium by intermittently reserving initial regions composed of free-space regions on the recording medium and recording management information of the initial regions regarding allocation to the real data for managing each of the initial regions after the real data are recorded and subsequently recording a block, which has a hierarchical structure and includes management information necessary to process the video data, the sound data, and the initial regions, on the recording medium by allocating management information, which corresponds the video data, the sound data, and the initial regions, respectively, to a lower hierarchical block.

Further, the present invention is applied to a recording medium having a file which is recorded thereon and formed of an real data block, in which a plurality of real data are integrated, and a management information block, in which a plurality of management information of the real data including at least information necessary to reproduce the real data allocated to the real data block are integrated in a hierarchical structure, thereby the real data block is recorded on the recording medium by sequentially, cyclically, and repeatedly recording the plurality of real data as well as by recording management information regarding allocation to the real data side for managing predetermined real data continuously recorded on the recording medium.

Therefore, according to the arrangements of the present invention, there can be provided the imaging device, which can manage the specific regions recorded by interleave processing more minutely than ever, and the recording medium on which the file that can be managed as described above is recorded.

According to the present invention, the specific regions recorded by interleave processing can be more minutely managed than ever.

Additional features and advantages of the present invention are described in, and will be apparent from, the following Detailed Description and the Figures.

BRIEF DESCRIPTION OF THE FIGURES

FIG. 8 is a view showing management information.

FIG. 9 is a diagram explaining respective entries of the management information of FIG. 8.

FIG. 10 is a view explaining the respective entries of the management information of FIG. 8 when a sound stream is recorded by post recording.

DETAILED DESCRIPTION

Embodiments of the present invention will be described below in detail referring to the figures appropriately.

(1) Arrangement of Embodiment 1

(1-1) Overall Arrangement of Imaging Device

Figure 1:
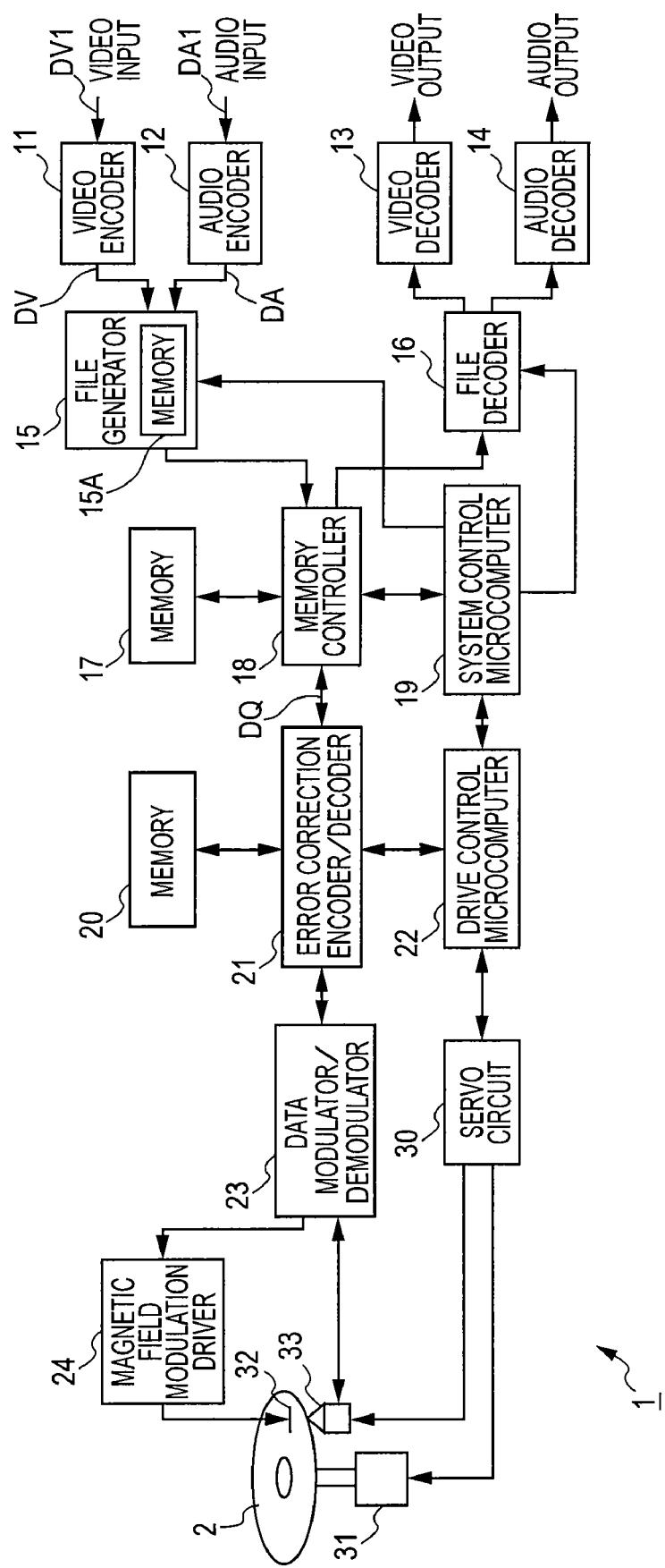
FIG. 1 is a block diagram showing an imaging device according to an embodiment 1 of the present invention.

FIG. 1 is a block diagram showing an imaging device according to an embodiment of the present invention. In the imaging device 1, a video signal and a sound signal of a subject is obtained by a imaging means and a sound obtaining means which are not shown, and a result of imaging obtained from the video signal and the sound signal is recorded on an optical disc 2. Further, the result of imaging recorded on the optical disc 2 is reproduced and output to a display means composed of a liquid crystal display panel and to a sound output means composed of a speaker and further output to external equipment. Further, the result of imaging is presented to a user as described above and subjected to edit processing in response to manipulation carried out by the user. In the imaging device 1, post recording is carried out by the edit processing.

In the imaging device 1, after the data of the video signal and the sound signal obtained from the result of imaging are compressed by the MPEG-2 system, they are recorded on the optical disc 2 using a predetermined file format. In the example, a QT format is applied to the file format.

With the above operation, a video encoder 11 generates video data by subjecting the video signal DV1 obtained from the result of imaging to analog/digital conversion processing and subjects the video data to coding processing according to an MPEG format, thereby an elementary stream DV composed of the video data is output.

An audio encoder 12 generates sound data by subjecting the sound signal DA1 obtained from the result of imaging to an analog/digital conversion processing and subjects the sound data to coding processing according to the MPEG format, a stream DA composed of the sound data is output.

At a time of recording, a file generator 15 generates and outputs data of movie data atom as a real data block in a QT file from the elementary streams DA and DV output from the video encoder 11 and the audio encoder 12. Further, in a series of processings, data necessary to generate a movie atom is recorded and stored in an incorporated memory 15A in correspondence to the data of the movie data atom, and when the movie data atom has been recorded, a data train of the movie atom is generated from the data stored in the memory 15A and output.

A memory controller 18 switches its operation under the control of a system control microcomputer 19, sequentially records and temporarily stores a data train formed in the QT file and output from the file generator 15 in a memory 17 at the time of recording and outputs the stored data in correspondence to subsequent processing carried out by an error correction encoder/decoder 21. Further, at a time reproduction, the memory controller 18 temporarily stores data output from the error correction encoder/decoder 21 inversely and outputs it to a file decoder 16 and to the system control microcomputer 19.

The error correction encoder/decoder 21 switches its operation under the control of the system control microcomputer 19 and temporarily records data output from the memory controller 18 in a memory 20 and adds an error correction code thereto at the time of recording. Further, the error correction encoder/decoder 21 reads out and outputs the data stored in the memory 20 in a predetermined sequence to thereby output the data to a data modulator/demodulator 23 after it is subjected to interleave processing. Further, the error correction encoder/decoder 21 temporarily stores data output from the data modulator/demodulator 23 in the memory 20 in a predetermined sequence and outputs it to the memory controller 18 at the time reproduction contrary to the time of recording to thereby output the data output from the data modulator/demodulator 23 after it is subjected to interleave processing. Further, at the time, the error correction encoder/decoder 21 carries out error correction processing using the error correction code attached at the time of recording.

The data modulator/demodulator 23 switches its operation under the control of the system control microcomputer 19 and converts data output from the error correction encoder/decoder 21 at the time of recording and then outputs the data to a magnetic field modulation driver 24 or to an optical pickup 33 after it is subjected to modulation processing. Further, at the time of reproduction, the data modulator/demodulator 23 reproduces a clock from a reproduction signal output from the optical pickup 33 and subjects the reproduction signal to binary recognition/demodulation processing using the clock as a reference to thereby obtain reproduction data corresponding to a serial data train generated at the time of recording, and outputs the reproduction data to the error correction encoder/decoder 21.

When the optical disc 2 is a magneto-optical disc, the magnetic field modulation driver 24 drives a magnetic field head 32 in response to a signal output from the data modulator/demodulator 23 under the control of the system control microcomputer 19 at the time of recording. The magnetic field head 32 is held in confrontation with the optical pickup 33 across the optical disc 2 and applies a magnetic field, which is modulated according to data output from the data modulator/demodulator 23, to a position to which a laser beam is irradiated from the optical pickup 33. With this operation, when the optical disc 2 is the magneto-optical disc, the imaging device 1 records the result of imaging on the optical disc 2 by the file of the QT format by applying a thermal magnetic recording method.

The optical disc 2 is a disc-like recording medium and a rewritable optical disc such as an magneto-optical disc (MO), a phase change type disc, and the like in the embodiment. A spindle motor 31 rotates the optical disc 2 under the control of a servo circuit 30 at a constant linear velocity (CLV), a constant angular velocity (CAV), or a zone CLV (ZCLV: Zone Constant Linear Velocity) according to the optical disc 2.

The servo circuit 30 controls operation of the spindle motor 31 in response to various types of signals output from the optical pickup 33 to thereby carry out spindle control processing. Further, the servo circuit 30 controls tracking and focusing of the optical pickup 33 likewise, causes the optical pickup 33 and the magnetic field head 32 to seek, and further carries out focus search processing and the like.

A drive control microprocessor 22 controls the seek operation and the like in the servo circuit 30 in response to an indication from the system control microcomputer 19.

The optical pickup 33 irradiates the laser beam to the optical disc 2, receives a return beam therefrom on a predetermined light receiving element, and subjects a result of light reception to arithmetic processing to thereby generate and output various types of control signals, and further outputs a reproduction signal whose signal level is changed according to a pit train and a mark train formed on the optical disc 2. Further, the optical pickup 33 switches its operation under the control of the system control microcomputer 19 and intermittently sets up a quantity of light of the laser beam to be irradiated to the optical disc 2 at the time of recording when the optical disc 2 is the magneto-optic disc. With this operation, the imaging device 1 records the result of imaging on the optical disc 2 by a so-called pulse train system. Further, when the optical disc 2 is the phase-change-type disc and the like, the optical pickup 33 increases the quantity of light of the laser beam to be irradiated to the optical disc 2 from the quantity of light in reproduction to that in writing according to the data output from the data modulator/demodulator 23 to thereby record the result of imaging on the optical disc 2 by applying a thermal recording method.

With these operations, after the imaging device 1 compresses the data of the video signal and the sound signal obtained from the result of imaging by the video encoder 11 and the audio encoder 12 and converts them to the elementary streams, it converts the resulting data to the file of the QT format by the file generator 15, and records the file of the QT format on the optical disc 2 by the optical pickup 33 or by the optical pickup 33 and the magnetic field head 32 sequentially passing through the memory controller 18, the error correction encoder/decoder 21 and the data modulator/demodulator 23.

Further, the imaging device 1 processes the reproduction signal obtained by the optical pickup 33 by the data modulator/demodulator 23 and obtains the reproduction data, processes the reproduction data by the error correction encoder/decoder 21 and reproduces it to the file of the QT format recorded on the optical disc 2, and outputs the data of the file of the QT format from the memory controller 18.

The file decoder 16 is input with the data of the QT format output from the memory controller 18, decomposes the data to the elementary streams of the video data and the sound data, and outputs the elementary streams. In the above processing, the file decoder 16 previously obtains and stores data of the movie atom under the control of seek and the like carried out by the system control microcomputer 19 and outputs the elementary streams of the video data and the sound data based on the management information set to the movie atom.

A video decoder 13 extends the elementary stream of the video data and outputs the extended elementary stream to a display means and external equipment that are not shown. An audio decoder 14 extends the elementary stream of the sound data output from the file decoder 16 and output the extended elementary stream to an audio output means and external equipment that are not shown. With these processings, the imaging device 1 outputs the result of imaging reproduced from the optical disc 2 so that it can be monitored.

The system control microcomputer 19 is a microcomputer for controlling the operation of the imaging device 1 in its entirety and controls operations of respective units in response to a manipulation of the user by carrying out a predetermined processing program recorded in a not shown memory. With this operation, the system control microcomputer 19 records the result of imaging on the optical disc 2, reproduces and presents the result of imaging recorded on the optical disc 2 to the user, and further subjects it to the edit processing.

Note that, in the imaging device 1, the program processed by the system control microcomputer 19 is provided by being installed previously. However, the program may be provided by being recorded in a recording medium in place of installing it previously. By the way, various types of recording mediums such as an optical disc, magnetic disc, memory card, magnetic tape, and the like can be widely applied as the above recording medium.

(1-2) QT File

Figure 2:
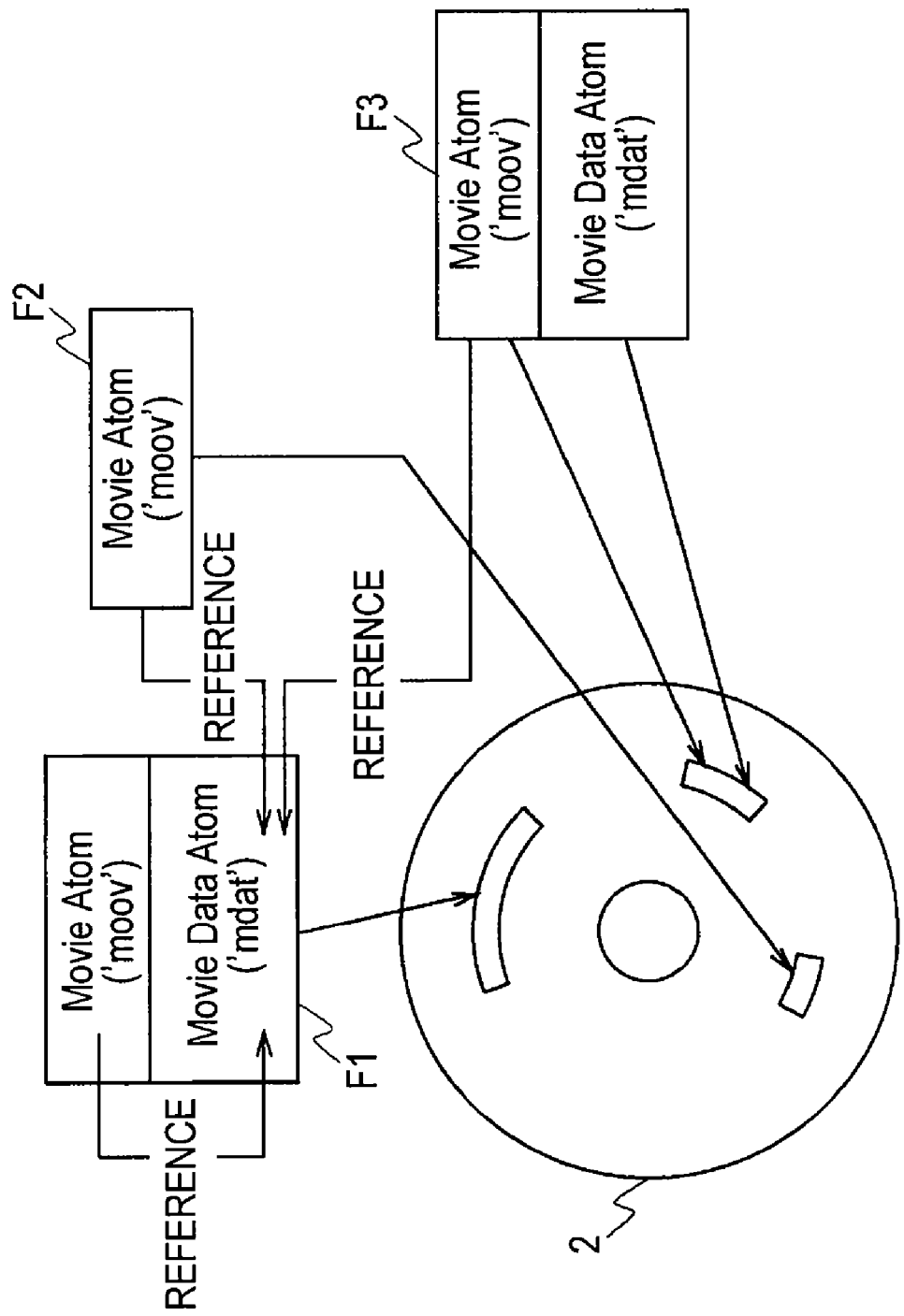
FIG. 2 is a schematic line view explaining atoms of a QT file.

FIG. 2 is a schematic line view showing a basic arrangement of the QT file. In the QT file F1, a movie data atom is formed by a set of tracks composed of real data, and a movie atom is formed by integrating management information and the like of the movie data atom. Note that the atom is also called a box. Further, a type name of the movie data atom is set to mdat and is also called a media data atom. In contrast, a type name of the movie atom is set to moov and is also called a movie resource.

The QT file includes the self-inclusive type file F1 composed of the movie data atom and the movie atom integrated with each other, and an external reference type file F2 composed only of the movie atom. In the external reference type file F2, a movie data atom existing in the other file F1 can be set as subject to be managed, thereby the external reference type file F2 can be used for a nondestructive edit and the like. Further, the QT file also includes a partly self-inclusive/partly external reference type file in which the real data is partly of the self inclusive type and partly of the external reference type as shown by reference numeral F3. Note that when the movie data atom existing in the other file F1 is used as the subject to be managed, management information such as a relative path, an absolute path, and the like on a recording medium regarding the other file is also allocated to the movie atom.

Figure 3:
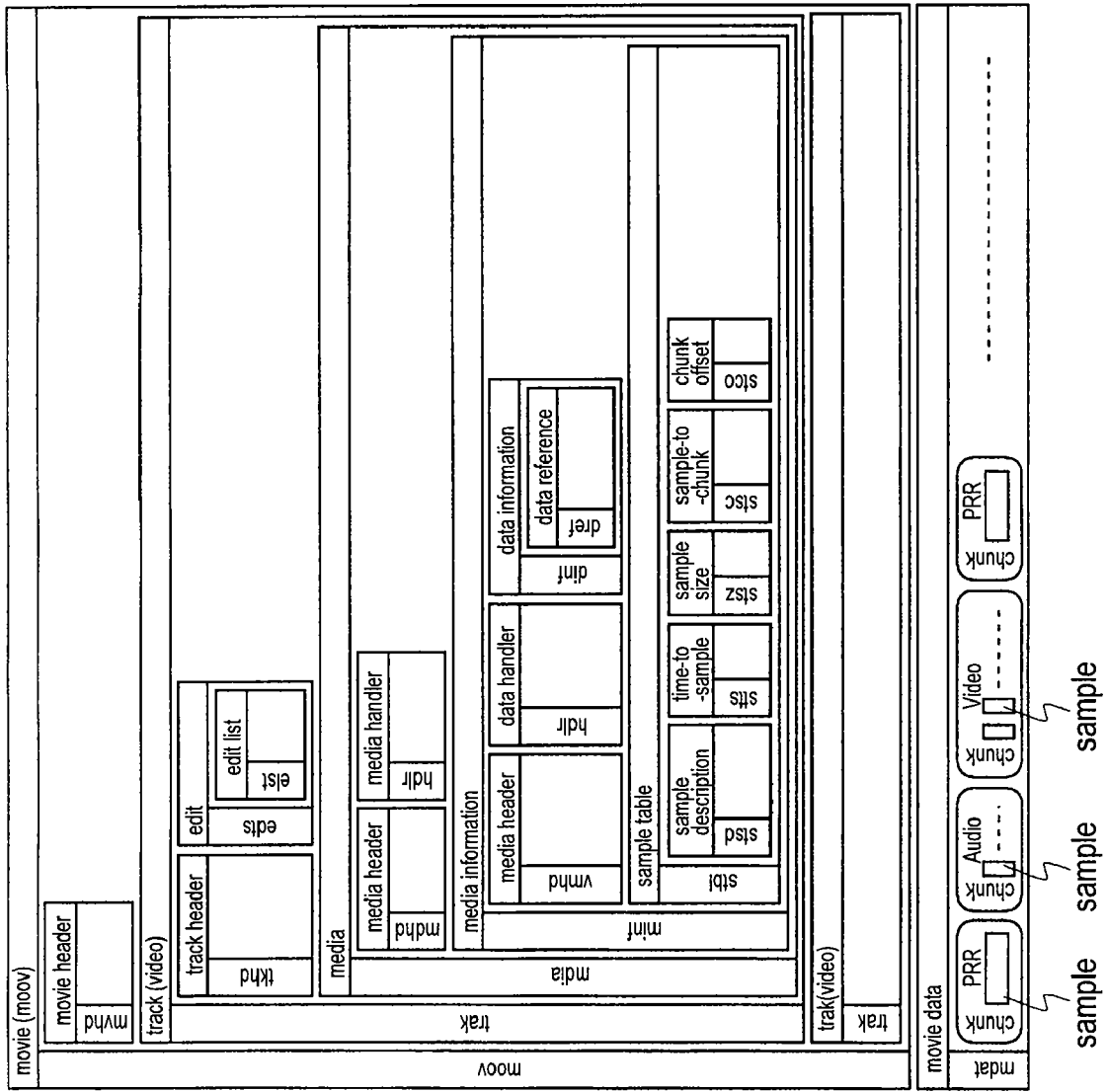
FIG. 3 is a view explaining a format of the QT file.

FIG. 3 is a view showing the movie data atom and the movie atom of the self-inclusive type file F1 in detail. Note that in the movie atom, track atoms (type: trak) are provided in corresponding to the tracks of the real data. Since the respective track atoms are approximately similarly arranged although they are different from each other depending on a type of the real data, a track atom corresponding to the elementary stream DV of the video data is described and the description of the other track atoms are omitted in FIG. 3.

In the movie data atom, the elementary streams of the real data of the QT file are allocated to chunks each composed of a set of samples, and the chunks of the respective real data are sequentially circularly provided. Note that FIG. 3 shows an example in which a reserve region stream to be described below, the sound stream (audio stream), and the video stream are allocated.

The movie atom is created in a hierarchical structure in which the management information is made to an atom for each attribute. That is, the movie atom is composed of a movie header atom (movie header), a track atom (track), and the like. The movie header atom accommodates header information, and its type name is set to mvhd. In contrast, the track atom (track) is set to each real data in correspondence to the track formed to the movie data atom. The track atom (track) is composed of a track header atom (track header), an edit atom (edit), a media atom (media), and the like, and information regarding respective real data of the movie data atom are described in the track atom.

The track header atom (track header) accommodates header information. The edit atom (edit) includes an edit list atom (edit list) when necessary, and the edit list atom (edit list) can be used for edit by setting information such as time information up to an in-point and an out-point, reproduction speed, and the like thereto.

The media atom (media) is allocated with information for managing a compression system, a storage location, a display time, and the like of real data to which the media atom corresponds, and its type name is set to mdia. The media atom (media) is composed a media head atom (media header), a media handler reference atom (media handler reference), and media information atom (media information). The media header atom (media header) is allocated with header information, its type name is set according to a type of corresponding real data, and type names corresponding to video, sound, and program streams are prepared as the type name. The media handler reference atom (media handler reference (shown by media handler in FIG. 3) is recorded with a type of corresponding real data so that the video data, the sound data, and the like can be identified thereby.

The media information atom (media information) is allocated with various types of information regarding a sample as a minimum management unit and its type name is set to minf. The media information atom (media information) is composed of a media header (media information header (shown by media header in FIG. 3)) corresponding to the real data, a data handler reference atom (data handler reference (shown by data handler in FIG. 3), a data information atom (data information), and a sample table atom (sample table).

The media header is set with a type name in correspondence to an upper media handler reference atom (media handler reference) to thereby accommodate header information. The data handler reference atom (data handler reference) is set with information regarding handling of corresponding real data and allocated with information of a data storage location and a data storage method that are actually referred to by a lower hierarchy data reference atom (data reference).

The sample table atom (sample table) is allocated with information regarding respective samples, and its type name is set to stbl. The sample table atom (sample table) is composed of a sample description atom (sample description), a time sample atom (time-to-sample), a sample size atom (sample size), a sample chunk atom (sample-to-chunk), a chunk offset atom (chunk offset), a synchronization sample atom (sync sample), a composition time sample atom (composition time-to-sample), and the like.

The sample description atom (sample description) stores information regarding decode and is specifically allocated with a data compression system and information regarding the system. The time sample atom (time-to-sample) describes a relation between each sample and a time base regarding decode by a frame rate. The sample size atom (sample atom) describes an amount of data of each sample. The sample chunk atom (sample-to-chunk) describes a relation between a chunk (chunk) and a sample constituting the chunk (chunk). Note that chunk (chunk) is respective blocks when respective track data are made to blocks and allocated, and one chunk is created by a set of plural samples. The chunk offset atom (chunk offset) is recorded with position information of respective chunk leading ends when a file leading end is used as a reference.

In the QT file, the sample table atom is allocated with specific information necessary to reproduce corresponding real data, and a recording position of the real data and an amount of data of each chunk and each sample can be detected by the record of the sample table atom. With these arrangements, in the QT file, the real data of the movie data atom can be processed based on the atom information of the hierarchical structure provided with the movie atom.

(1-3) Control by System Control Microcomputer 19

In the embodiment, when the user indicates to record the result of imaging, the system control microcomputer 19 indicates the imaging means and the sound obtaining means to start to obtain the result of imaging and indicates the video encoder 11, the audio encoder 12, the file generator 15 and the like to start recording, thereby the data train of the movie data atom of the QT file is recorded on the optical disc 2 in response to the video signal and the sound signal. Further, when the user indicates to end the recording of the result of imaging, the system control microcomputer 19 indicates to end the recording of media data train of the QT file, the data train of a corresponding movie atom is recorded on the optical disc 2, thereby the result of imaging is recorded by a QT file format.

In the recording of the movie data atom, when the user indicates to record the result of imaging by a post record possible mode, the system control microcomputer 19 also indicates the file generator 15 to record a region securing stream DD by a region obtaining dummy data, thereby a QT file is generated by three streams, that is, by a stream DV by video data, a stream DA by sound data, and the region securing stream DD.

Figure 4:
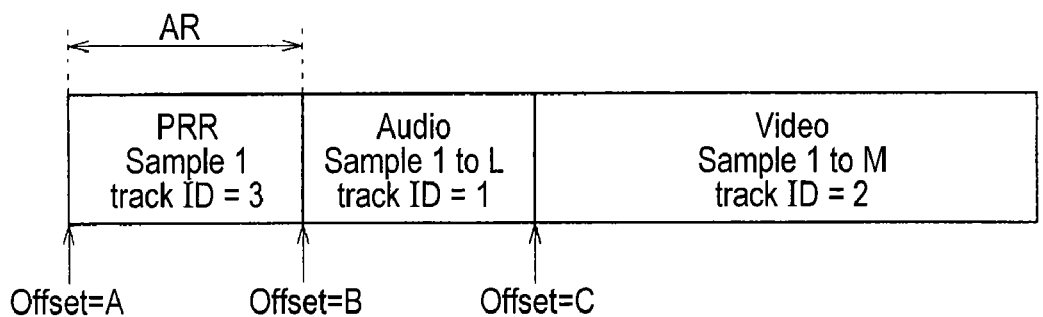
FIG. 4 is a view explaining acquisition of a space region.

With this operation, as shown in FIG. 4, the system control microcomputer 19 records the result of imaging on the optical disc 2 by repetition of a space region PRR (AR), a sound region Audio in which the stream DD of the sound data is recorded, and a video region Video in which the stream DV of the video data is recorded and records the real data by intermittently reserving post recording space regions AR on the recording medium by the region PRR of the region securing stream DD. Note that, in the following description, the regions initially obtained by the region securing stream DD are called initial regions AR.

Figure 5:
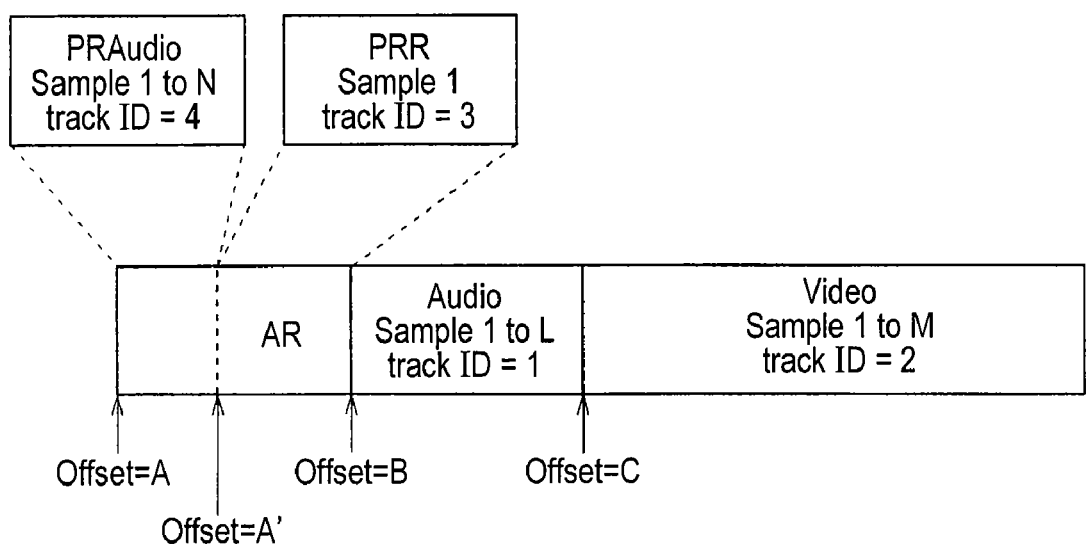
FIG. 5 is a view explaining post recording carried out using the space region of FIG. 4.

That is, as shown in FIG. 5, the imaging device 1 carries out post record processing by overwriting sound data for post recording in the initial regions AR. FIG. 5 shows a state that the sound data is recorded by post recording in the leading end side region of the initial region AR, a post recorded sound region PRAudio, in which the sound data is recorded, is formed in the leading end side region of the initial region AR, and the space region PRR is reduced accordingly. With this operation, since the imaging device 1 carries out the post record processing using the initial regions AR intermittently formed to the continuously recorded real data, the post record processing can be executed while continuously monitoring the result of imaging and further a result of post recording can be monitored continuously.

Figure 6:
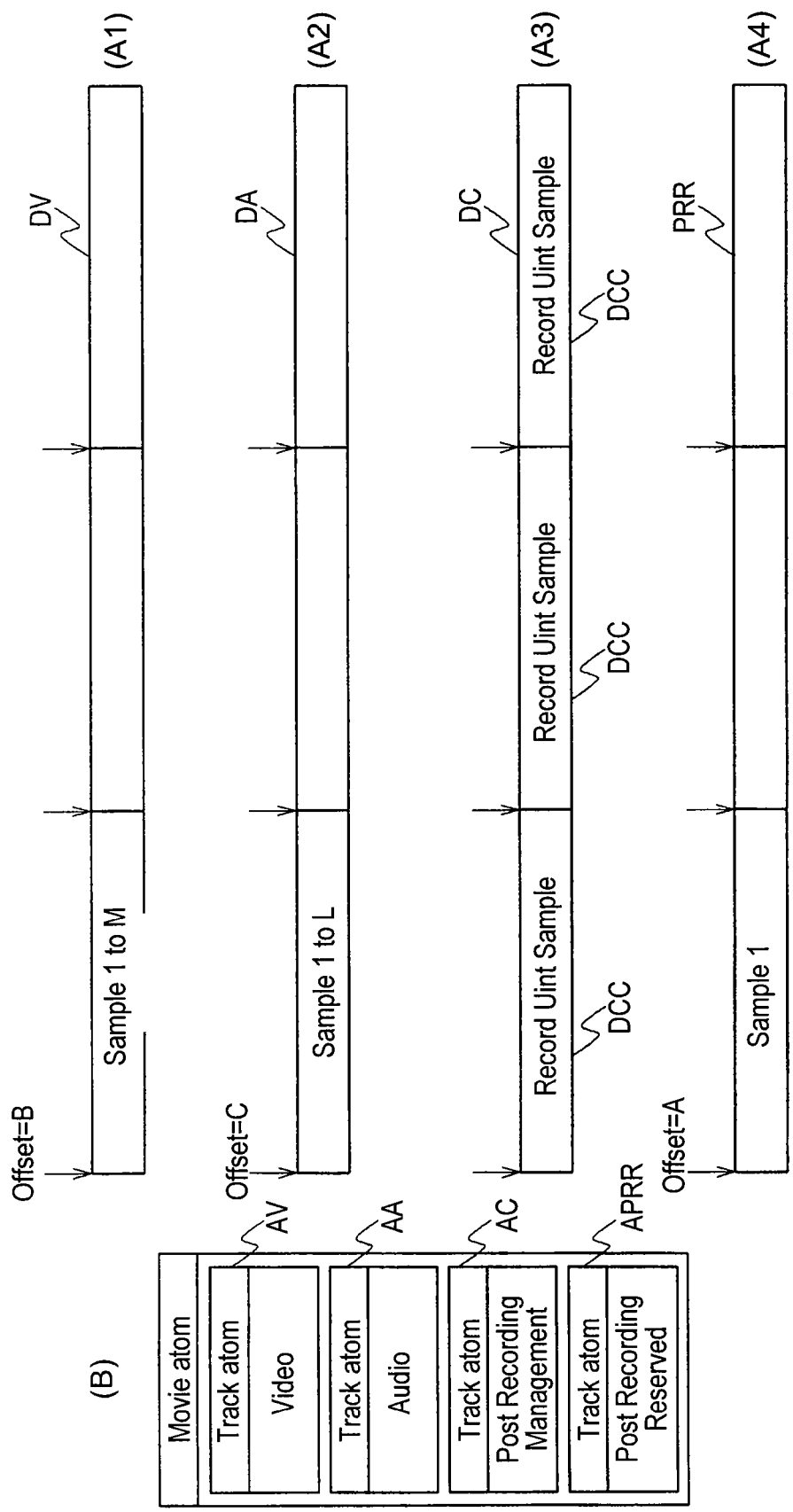
FIG. 6 is a view showing a structure of the QT file corresponding to the state shown in FIG. 4.

Further, as shown in FIG. 6, the system control microcomputer 19 records a track atom APRR corresponding to the space region PRR (FIG. 6(A4)) on the optical disc 2 by movie data, in addition to video and sound track atoms AV, AA corresponding to the video and sound streams DV, DA (FIG. 6(A1) and (A2)) (FIG. 6(B)). Note that in the video and sound track atoms AV, AA, a recording unit of the video region Video and the sound region Audio are set to the chunks (chunk), and information and the like regarding offsets (Offset) C, B and the samples (1–m), (1–L) of the respective chunks are allocated to the video and sound track atoms AV, AA. In contrast, regarding the space region PRR, similar offsets (Offset) A and the like are allocated to the track atom APRR (FIG. 6(A3)).

In the embodiment, as to the space region PRR, the system control microcomputer 19 sets the number of samples of one chunk to 1 and sets identifiers (trackID) of the stream DV by the video data, the stream DA by the sound data, and data regarding the space region PRR (region securing stream DD just after the result of imaging is recorded) to 2, 1, 3, respectively.

Figure 7:
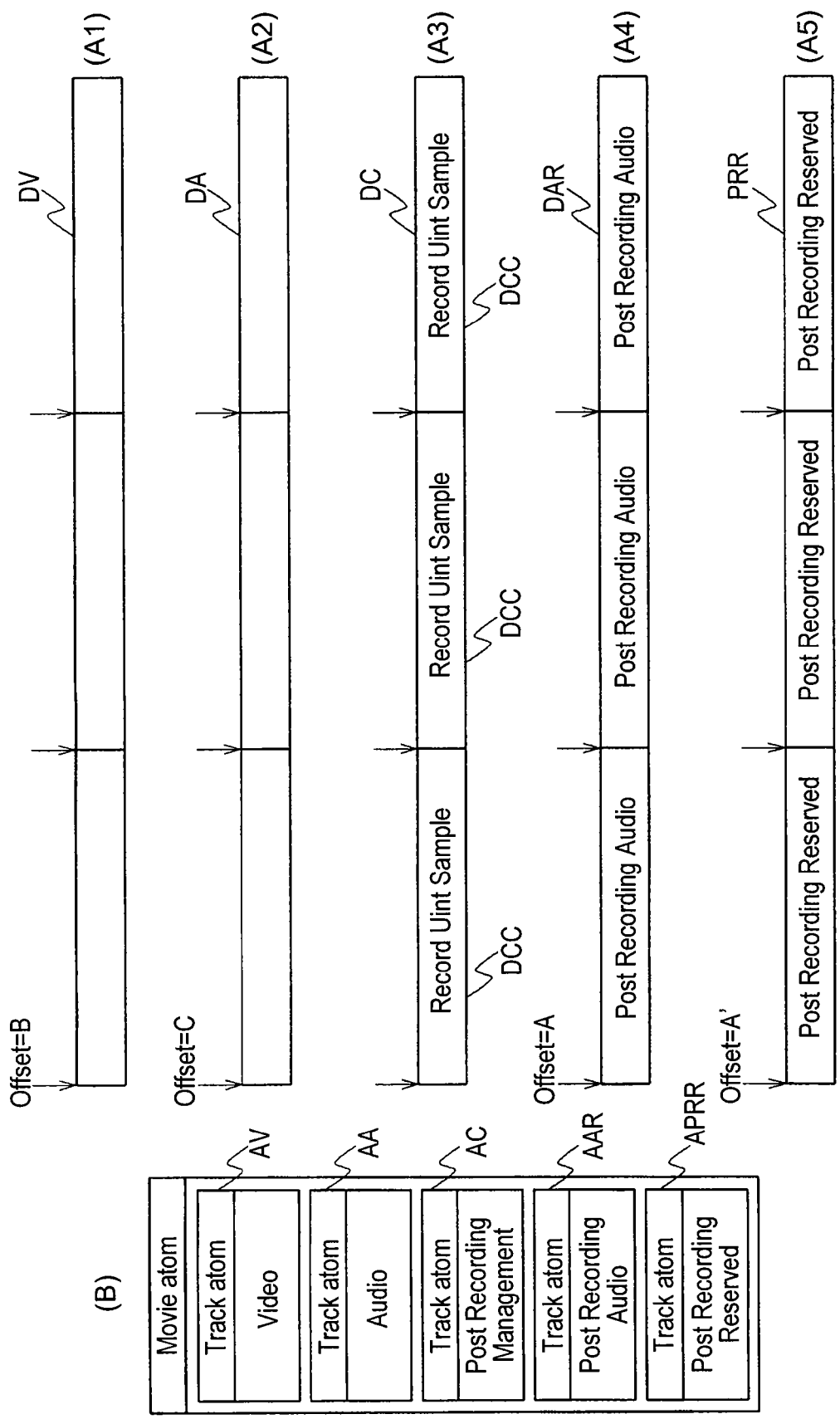
FIG. 7 is a view showing a structure of the QT file corresponding to the state shown in FIG. 5.

Further, as shown in FIG. 7 in comparison with FIG. 6, when the post record processing is carried out as shown in FIG. 5, the movie data atom is formed by adding a track (FIG. 7(A4) resulting from post recording sound data DAR, in addition to the track resulting from the video data stream DV (FIG. 7(A1)), the track resulting from the sound data stream DA (FIG. 7(A2)), and the track relating to the space region PRR (FIG. 7(A5)) up to that time. Further, a track atom AAR corresponding to the track resulting from the post recording sound data DAR is added as well as the contents of the track atom PRR in the space region PRR are changed to thereby form a movie atom. Note that a value of offset, data amounts of the chunk and the sample, and the like are changed to change the contents of the track atom PRR in the space region PRR.

Inversely to the above case, when the user indicates to delete the sound track in a state that the sound track is formed by the post recording as described above, the track atom AAR corresponding to the sound track is deleted from the movie atom by processing to be described below under the condition that the sound track is not referred to by other file. Further, the track atom APRR in the space region PRR is changed to cope with the space region PRR increased by the delete inversely to the time of recording. Note that, in this case, the movie data atom is left as it is without subjecting it to any processing so that the space region PRR is formed on the recording medium by the region securing stream and the data of the sound track to be deleted.

When the initial region AR is secured and the post record processing is carried out as described above, the system control microcomputer 19 forms a management track DC of management information in the movie data atom to manage the initial region AR by management information (FIG. 6(A3) and FIG. 7(A3)).

The management track DC is a track for managing the initial regions AR secured by the region securing stream DD, and each initial region AR is provided with management data DCC as shown in FIG. 8 that is management information to be allocated to the real data to manage the initial region. That is, a size (Post recording Area size) showing a size of the initial region AR and the number of entries (number of entries) showing the number of subsequent entry information are allocated to the management data DCC, and a plurality of entry information (Post Recording Area Info) as many as the number of the entries are provided. The entry information (Post Recording Area Info) is provided with each of real data recorded in the initial region AR, and information as to corresponding real data is allocated.

More specifically, an identifier (Track-ID) of corresponding real data, an index value (Sample-index) from a leading end initial region AR, the number of samples (Sample-count) allocated by the corresponding real data, and the number of references (Referred-counter) showing the number of files that make reference are allocated to the entry information (Post Recording Area Info). Note that the number of references, which makes reference by an external reference system is set as the number of references (Referred-counter).

Accordingly, in the management data DCC, when all the initial regions AR are allocated to the space regions PRR just after the result of imaging is recorded as described above with reference to FIG. 4, one piece of entry information (Post Recording Area Info) is registered, and an identifier 3 of a track of the space region PRR is allocated to an identifier (Track-iD) of a streaming to which the entry information (Post Recording Area Information) corresponds as shown in FIG. 9. Further, when the initial region AR is the leading end sample of the management track DC, the index value (Sample-index) is set to 1, and the subsequent number of samples (Sample-count) and the number of references (Referred-counter) are set to values, 1, 0, respectively because this is just after the result of imaging is recorded.

In contrast, when the sound data is recorded only to the initial region AR at the leading end and the space region PRR is reduced thereby as shown in FIG. 5, two entries are registered to the sample at the leading end of the management track DC and streaming information of the sound data and information regarding the space region PRR are allocated to the two entries, respectively as shown in FIG. 10. In this case, in one of the two entries, an identifier (Track-id) of a corresponding stream is set to the identifier 4 of the stream of the sound data, the index value (Sample-count) is set to a value 1, and further the subsequent number of samples is set to the number of samples N of the sound data. Note that the number of reference-making samples (Referred-counter) is set to 1 when reference is made from one external file. Further, the remaining one entry is held in its original state. In contrast, the subsequent samples to which no sound data is recorded are held in their original state without being changed at all.

The system control microcomputer 19 manages the management track DC as described above, and when the user indicates other file to refer to the sound stream managed by the management track DC, the system control microcomputer 19 counts up the number of corresponding management information being referred to and updates the management track DC. Inversely, when the sound stream managed by the management track DC is not referred to by other QT file due to an indication for deleting a file referred to externally and further an indication for carrying out edit processing and the like, the number of corresponding management information to be referred to is subtracted accordingly.

In contrast, even if it is indicated by the user to delete the sound track on the QT file, when the number of references is set to a value larger than 0 and it is indicated that reference is made by other file, the system control microcomputer 19 notifies the user that the sound track cannot be deleted and obtains a further indication from the user.

Further, when it is indicated by the user to delete the sound track on the QT file in a state that it is confirmed that no reference is made from other file because the number of references is set to 0, the system control microcomputer 19 accepts the indication from the user and deletes the entry of the sound stream. With the above operation, the contents of the management track DC are changed so that they are consistent to the delete of the track atom of the sound track and to the change of the track atom of the space region PRR described above.

With the above operation, when the system control microcomputer 19 records the result of imaging by the track of the video data stream DV, the track of the sound data stream DA, and the track of the space region PRR using the region securing data DD in response to a manipulation of the user, the system control microcomputer 19 subsequently records the management track DC by the number of corresponding samples, finishes to record the movie data atom of the result of imaging, and subsequently controls an overall operation so that the movie atom is recorded.

With the above operations, in the imaging device 1, the initial regions AR are arranged such that they can be managed by the management information of the track atom of the real data allocated to them and by the management information DCC of the management track DC, thereby the post recording regions can be managed more minutely than ever.

With this arrangement, the system control microcomputer 19 carries out a series of post record processings by managing the initial regions AR by the management information of the track atom of the real data allocated to the initial regions AR and by the management information of the management track DC.

Figure 11:
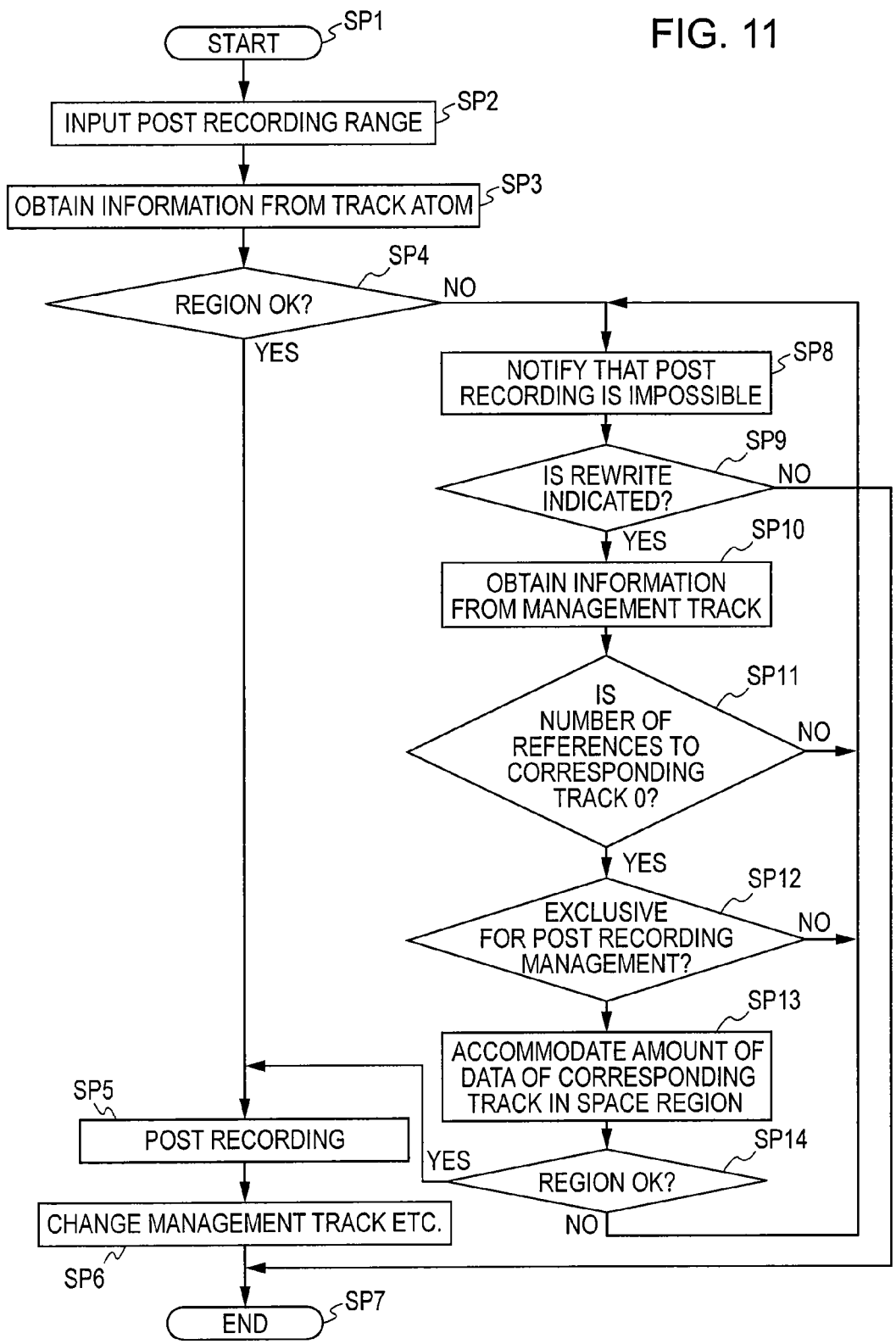
FIG. 11 is a flowchart showing a processing procedure of a system control microcomputer of the imaging device of FIG. 1.

That is, FIG. 11 is a flowchart showing a processing procedure carried out by the system control microcomputer 19 in post recording. When post recording is indicated by the user, the system control microcomputer 19 moves from step SP1 to step SP2 at which it is input with a post recording range.

Subsequently, the system control microcomputer 19 moves to step SP3 at which it detects an amount of data of the space region PRR in the thus input post recording range by the corresponding management information DCC of the management track DC and the record of the track atom detected from the management information DCC. At subsequent step SP4, the system control microcomputer 19 determines whether or not a sufficient region exists for post recording by comparing the detected amount of data with an amount of data predicted by the post recording.

When an affirmative result is obtained here, the system control microcomputer 19 moves from step SP4 to step SP5 at which it carries out the post record processing. The post record processing is carried out by controlling an overall operation so that record/reproduction processing is repeated at short time intervals, replacing the reproduced data of a space region with sound data for post recording within the range of post recording, and recording the replaced sound data again while recording the video data, the sound data, and the data of the space region, which are recorded on the optical disc 2, in a range including the post recording region.

When the system control microcomputer 19 carries out the post record processing as described above, it moves to step SP6 at which it updates the corresponding management data DCC of the management track DC so that it corresponds to the sound track for post recording, updates the track atom of the region securing data, and further adds a track atom corresponding to the sound track of the post recording to the movie atom, and moves to step SP7 at which the processing procedure is completed.

With this operation, even if the region secured on the recording medium by the region securing data is reduced by the post recording, the system control microcomputer 19 carries out the post record processing in a remaining region as long as it is sufficient for post recording, thereby the post recording region can be more minutely managed than ever, and the space region can be effectively utilized.

In contrast, when a negative result is obtained at step SP4, the system control microcomputer 19 moves from step SP4 to step SP8. At step SP8, the system control microcomputer 19 notifies the user that it is difficult to carry out the post recording due to an insufficient amount of the space and obtains an indication from the user. At subsequent step SP9, the system control microcomputer 19 determines whether or not the user indicates to rewrite an already recorded post recording track. When a negative result is obtained at step SP9, the system control microcomputer 19 moves from step SP9 to step SP7 at which the processing procedure is finished.

In contrast, when an affirmative result is obtained at step SP9, the system control microcomputer 19 moves from step SP4 to step SP10. At step SP10, the system control microcomputer 19 obtains the management information DCC in the post recording range from the management track DC, and, at subsequent step SP11, the system control microcomputer 19 determines whether the number of references that refer to the sound track whose rewrite is indicated by the user through a track ID set to the management information DCC is zero or not at. With this determination, the system control microcomputer 19 confirms that the sound track is not referred to by other file, and when an affirmative result is obtained at step SP11, the system control microcomputer 19 moves from step SP11 to step SP12.

At step SP12, the system control microcomputer 19 determines whether or not the sound track whose rewrite is indicated by the user is exclusively used to manage post recording, and when a negative result is obtained, the system control microcomputer 19 returns to step SP8, whereas when an affirmative result obtained, the system control microcomputer 19 moves to step SP13 at which it detects amounts of data of the respective chunks from the track atom of the sound track whose delete is indicated. Further, the system control microcomputer 19 the accommodates the amount of data of the sound track whose rewrite is indicated by the user in the space region PRR by adding the detected amount of data to the amount of data of the space region PRR detected from the track atom of the management data DCC and the like.

At subsequent step SP14, the system control microcomputer 19 determines whether or not a sufficient region exists for post recording by comparing the detected amount of data with an amount of data predicted by post recording.

When an affirmative result is obtained at step SP14, the system control microcomputer 19 moves from step SP14 to step SP5 at which it carries out the post record processing. In this case, the system control microcomputer 19 carries out the post record processing by sequentially recording sound data to the region in which the sound data of the sound track indicated by the user is recorded and to the space region PRR and deleting the data of the sound track whose rewrite is indicated by the user by overwrite.

Further, at subsequent step SP6, the system control microcomputer 19 changes the track atom of the sound track whose rewrite is indicated to correspond to the post record processing so that the changed track atom corresponds to the sound track after it is rewritten, changes the track atom of the space region PRR, further changes it so that it corresponds to the rewrite of the management track DC, and then moves to step SP7.

With this operation, the system control microcomputer 19 reuses the post recording region AR by effectively utilizing the management information provided with the management track DC.

In contrast, when a negative result is obtained at step SP11, the system control microcomputer 19 returns to step SP8 at which it notifies the user that the region is insufficient even if it is rewritten and thus it is difficult to carry out the post recording.

(2) Operation of Embodiment 1

With the above arrangement, in the imaging device 1 (FIGS. 1-3), the video signal DV1 obtained by the imaging means is subjected to the encode processing by the video encoder 11 and input to the file generator 15 through the video stream DV, the sound signal DA1 obtained by a microphone and the like is subjected to the encode processing by the audio encoder 12 and a sound stream DA is input to the file generator 15, these streams DV, DA are converted into the data train of the movie data atom of the QT file format, and the data train is recorded on the optical disc 2 by a series of subsequent arrangements. Further, the data train of the movie data atom is recorded as described above, subsequently, the data train of the movie atom is generated by the file generator 15 under the control of the system control microcomputer 19, and the data train is recorded on the optical disc 2 by a series of subsequent arrangements, thereby the result of imaging is recorded on the optical disc 2 by the QT file.

When the post record possible mode is indicated by the user in the series of processing, the data train of the movie data atom is generated by allocating the region securing stream DD in addition to the video stream DV and the sound stream DA, the data train is recorded on the optical disc 2, the space regions PRR of the initial regions AR are intermittently disposed on the optical disc 2 in response to the region securing stream by interleave processing at a time of recording, and the real data is recorded by repeating the space region PRR, the region in which the video stream DV is recorded, and the region in which the sound stream DA is recorded (FIG. 4).

With these operations, the imaging device 1 can record the post recording sound stream in the thus secured space region PRR and can continuously carry out post recording (FIG. 5).

When the real data is recorded as described above, in the imaging device (FIGS. 6 and 7), the management data DCC for managing the thus secured initial region AR is allocated thereto, and the data of the management track DC of the management information DCC is generated by the file generator 15 under the control of the system control microcomputer 19 using the allocation of the management information DCC to the initial region AR as a sample, and when the record of the data train obtained from the result of imaging is completed, the management track DC is recorded on the optical disc 2, thereby the record of the movie data atom is completed.

Further, the management track DC is handled as the real data, and further the space region is handled as a region in which the real data of the region securing stream DD is recorded. Accordingly, the track atom AC of the management track DC and the track atom APRR of the space region PRR are formed in the movie data atom and recorded on the optical disc 2 together with the track atoms AV, AND of the video stream DV and the sound stream DA, thereby the movie data atom is recorded. Accordingly, the movie atom, which includes management information arranged as a block of a hierarchical structure, has a track atom that includes lower hierarchal management information corresponding to respective real data.

With the above arrangement, the initial region AR as the post recording region can be managed also by the management information DCC of the management track DC in addition to that it is managed by the track atom, thereby the initial region AR can be more minutely managed than ever. Accordingly, a space region, which remains after a sound stream is recorded by, for example, post recording, can be reused, and further a region, in which a sound stream is recorded to manage a reference relation made by other file, can be reused.

In the imaging device 1, the management information DCC is allocated with a size of the initial region AR (Post Recording Area Size), an identifier (Track-ID) for specifying data recorded in the initial region by post recording and the like, an index value (Sample-index), the number of samples (Sample-count), the number of references (Referred-counter) that shows the number of references, thereby, for example, a track recorded in the initial region and various kinds of information of the samples regarding the track can be simply detected. Further, whether or not other file makes reference can be simply detected, thereby processing of a sound stream regarding post recording can be simplified. Further, since the management information is provided in correspondence to the chunks of respective streams, the information of other streams allocated to the initial regions and further a size of a space region that can be used for post recording can be simply obtained for respective chunks.

Accordingly, in the imaging device 1, processings such as post recording and the like are carried out by managing the initial region AR by the management information DCC of the management track DC and the management information of the track atom that belongs to the initial region AR.

More specifically, when, for example, no sound stream is recorded by post recording after the result of imaging is recorded, it is detected that sufficient space regions are secured in the range used for post recording by the management information DCC, thereby so that it can be used for post recording, thereby a sound stream regarding post recording is sequentially recorded in corresponding space regions PRR. The record of the management track DC is updated so as to correspond to the record of the sound stream, and further the track atoms that belong to the initial regions are corrected. In the movie atom, the offset indicating the recording start position of the data recorded in the track atoms of the space regions, a size of the data, and the like are updated so as to correspond to the space regions PRR whose size is reduced by recording the sound stream, and further the track atom of the newly recorded sound stream is recorded.

Even after the sound stream is recorded as described above, it is determined whether or not the space region PRR is sufficient to further carry out post recording by the management information DCC of the management track DC and the management information of the track atoms belonging to the initial regions AR, thereby whether or not a sound stream regarding post recording can be further recorded. When it is determined possible, the sound stream is recorded using the remaining space region PRR. Further, the management track DC is updated so as to correspond to the recorded sound stream, and further the track atoms belonging to the initial regions AR are corrected. Therefore, in this case, in the movie atom, the offset, the size, and the like recorded in the track atoms APRR of the space regions PRR are updated so as to correspond to the recorded sound stream, the track atom of the newly recorded sound stream is recorded.

In contrast, when other QT file refers to the sound stream recorded by post recording as described above, the number of references of the management information DCC provided with the management track DC is incremented. Further, when the reference made by other QT file is cancelled, the number of references is decremented.

When the user indicates to delete a sound stream made by post recording by the increment processing and the like, whether or not the sound stream is referred to by other QT file is determined by the record of the management track DC, and the sound stream is deleted only when it is not referred to. In this case, in the imaging device 1, the management track DC is updated in correspondence to the delete of the sound stream, a corresponding track atom APRR is updated in correspondence to the space region PRR increased by the delete of the sound stream, and further the track atom of the deleted sound stream is deleted from the movie atom.

In contrast, when the user indicate to carry out post recording by overwrite, whether or not a sound stream, which is to be deleted by the overwrite, is referred to is determined likewise the case of delete of the sound stream, and a sound track is recorded by overwrite as long as the sound stream is referred to by other file, and the management track DC and the like are updated in correspondence to the overwrite.

As a result, in the imaging device 1, the initial region that is a specific region recorded by interleave processing can be more minutely managed than ever, thereby the space region and the like can be effectively used by post recording.

(3) Advantages of Embodiment 1

According to the above arrangement, the management track for managing the specific region recorded by interleave processing is formed to a movie data atom that is the real data block and the specific region is managed by the management track and the track atom disposed to the management information block, thereby the specific region recorded by the interleave processing can be more minutely managed than ever.

More specifically, the initial region can be effectively used for post recording and the like by managing it based on the management information of the management track provided with the real data block and on the management information of the track atom that is the lower hierarchical block belonging to the initial region.

Further, at the time, desired data is recorded in the initial region and the management information of the management track and the track atom of the space region are updated as well as a track atom is formed in correspondence to the recorded desired data by managing the initial region, thereby a remaining region and the like can be effectively used by specifically recording data of post recording and the like thereto.

More specifically, in this case, whether or not it is possible to use the initial region can be simply and securely determined by determining whether or not other data can be further recorded in the initial region by managing the initial region.

Further, a remaining space region can be used for post recording and the like by a simple management by further recording other data in the initial region by managing the initial region.

More specifically, when other data, which is recorded in the initial region, is recorded in the space region of the initial region, the space region can be effectively utilized. Further, when other data is recorded in the initial region by overwriting the data recorded in the initial region, the initial region can be effectively utilized in its entirety.

Further, whether or not it is possible to delete the data recorded in the initial region can be simply and securely determined by managing the initial region likewise.

Further, when the data recorded in the initial region is deleted from the real data block and the track atoms regarding the management track and the space region are updated as well as the track atom regarding the delete are deleted by managing the initial region, the initial region can be managed minutely by the management track and by the track atom belonging to the initial region even after they are deleted.

Further, since the management information has the identifier for specifying the data recorded in the initial region, the stream recorded in the initial region can be simply and securely detected in continuous regions and further in a unit of chunk.

Further, since the management information is the number of references that is the information showing the number of files referring to the real data recorded in the initial region, a reference relation of other files can be simply and securely managed. Further, since the management information has the information showing the size of the space region in the initial region, whether or not post recording is possible can be determined only by the management information.

(4) Embodiment 2

In an embodiment 2, an initial region is used to record data such as a result of imaging of a still image recorded by other imaging device, a title, and the like, in place of the sound stream recorded by post recording, and record, delete, and rewrite processings of the data are carried out by managing the initial region likewise the embodiment 1 described above.

Even if data other than sound data recorded by post recording is recorded as in the embodiment 2, a management track for managing a specific region recorded by interleave processing is formed to a movie data atom, and the specific region is managed by a management track and a track atom that is disposed to a management information block likewise the embodiment 1, thereby the specific region used to record the data can be managed more minutely than ever.

(5) Embodiment 3

An embodiment 3 is applied to an optical disc system of a mastering device used to make a CD-ROM (Compact Disc Read Only Memory), a DVD (Digital Versatile Disc), and the like to record a plurality of video data regarding a multi-image screen and a plurality of voice data of various foreign languages used for dubbing in the initial region described above from the beginning. Further, a management track is formed to the a plurality of data recorded in the initial region and recorded. In the embodiment, a movie data atom is formed by the above operations. Further, a movie atom is formed so as to correspond to the real data of the movie data atom and to the management track likewise the embodiments described above.

With this arrangement, according to the embodiment 3, in an optical disc recording device using a QT file, the plurality of real data are sequentially, cyclically, and repeatedly recorded as well as a management track of management information is recorded to manage predetermined real data to be continuously recorded on a recording medium, thereby a management track for a specific region of the continuously recorded real data is formed. As a result, the predetermined real data can be managed by a corresponding track atom and a management track.

In the embodiment, the minute control is utilized to manage the plurality of video data regarding the multi-image screen, the plurality of voice data of the various foreign languages, and the like, thereby usability can be more improved.

A reproduction device for reproducing the optical disc made as described above detects the positions where the video data regarding the multi-image screen and the voice data for dubbing are prepared by searching the management track. Then, the reproduction device notifies the user of a timing at which the multi-image screen and the dubbing can be processed while reproducing the streams of intrinsic video and sound data, thereby the multi-image screen and the dubbing can be processed in response to a manipulation carried out by the user.

When the plurality of real data are sequentially, cyclically, and repeatedly recorded as well as the management track of the management information is recorded to manage the predetermined real data continuously recorded on the recording medium, the region of the plurality of the real data can be more minutely managed than ever even if the management track of the specific region, in which the predetermined real data is continuously recorded is formed, and the specific real data is managed by the corresponding track atom and the management track.

(6) Other Embodiments

Although the embodiments described above explain the case in which whether or not the streams indicated by the user can be processed is determined by the number of references, the present invention is by no means limited thereto and only the streams that can be processed may be notified to the user depending on the number of references.

Although the embodiments described above explain the case in which when post recording is difficult, it is simply notified to the user, the present invention is by no means limited thereto and can be widely applied to a case in which when post recording is difficult, it is processed by a different file by copying a movie data atom, and the like.

Although the embodiments described above explain the case in which the audio and video elementary streams obtained from the result of imaging are recorded, the present invention is by no means limited thereto and can be widely applied to record a program stream, a transport stream, and the like in which a plurality of elementary streams are multiplexed.

Although the embodiments described above explain the case in which the present invention is applied to the imaging device, and the like using the QT file, the present invention is by no means limited thereto and can be widely used for a recording device, a reproduction device, and the like of a file having the same structure as the QT file, for example, the ISO Base Media file format (MPEG-part 12), Motion JPEG 2000

(MJ2) file format, AVC (Advanced Video Coding: MPEG4-part 10) file format, and the like whose standard is based on the QT file.

Although the embodiments described above explain the case in which the QT file is recorded on the optical disc, the present invention is by no means limited thereto and can be also widely applied to a case in which the QT file is recorded on various types of recording mediums such as an magnetic disc, a memory card, and the like.

Further, although the embodiments described above explain the case in which the present invention is applied the optical disc system of the imaging device and the mastering device, the present invention is by no means limited thereto and can be widely applied to, for example, various types of file processing devices such an edit device and the like.

INDUSTRIAL APPLICABILITY

The present invention can be applied to an imaging device for recording a result of imaging by, for example, a Quick-Time file format.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A file processing device comprising:
a processor;
a memory device storing instructions which when executed by the processor, cause the processor to:
(a) record, on a recording medium, a file which has a format in which a plurality of real data are allocated, said real data including a plurality of management information, said file being formed of:
(i) a real data block in which the real data are integrated; and
(ii) a management information block in which the management information of the real data including at least information necessary to reproduce the real data allocated to the real data block are integrated in a hierarchical structure,
(b) record the real data block on the recording medium by:
(a) intermittently reserving initial regions composed of free-space regions on the recording medium; and
(b) recording, in the real data block, management information of the initial regions regarding allocation to the real data for managing each of the initial regions after the real data are recorded; and
(c) record the management information block on the recording medium by recording a lower hierarchical block of management information corresponding to each of the real data and a lower hierarchical block composed of management information regarding the free-space regions in the initial regions which correspond to the above lower hierarchical block.

2. The file processing device of claim 1, wherein when executed by the processor, the instructions cause the processor to manage the initial regions based on the management information of the initial regions regarding the allocation to a real data side and on the management information by the lower hierarchical block that belongs to the initial regions.

3. The file processing device of to claim 1, wherein, when executed by the processor, the instructions cause the processor to:
(a) record desired data in the initial regions while the initial regions are managed; and
(b) update the management information of the initial regions regarding the allocation to the real data side and the management information of the lower hierarchical block regarding the free-space regions in response to the record of the desired data as well as the lower hierarchical block corresponding to the record of the desired data is formed to the management information block.

4. The file processing device of according claim 3, wherein when executed by the processor, the instructions cause the processor to determine whether or not other data can be further recorded in the initial regions by managing the initial regions.

5. The file processing device of claim 3, wherein when executed by the processor, the instructions cause the processor to record other data in the initial regions by managing the initial regions.

6. The file processing device of claim 5, wherein when executed by the processor, the instructions cause the processor to record other data recorded in the initial regions in the free-space regions of the initial regions.

7. The file processing device of claim 5, wherein when executed by the processor, the instructions cause the processor to other data recorded in the initial regions by overwriting data recorded in the initial regions.

8. The file processing device of claim 3, wherein when executed by the processor, the instructions cause the processor to determine whether or not data recorded in the initial regions can be deleted by managing the initial regions.

9. The file processing device of claim 3, wherein when executed by the processor, the instructions cause the processor to:
(a) delete the data recorded in the initial regions from the real data block by managing the initial regions; and
(b) update the management information of the initial regions regarding the allocation to the real data side and the lower hierarchical block of the management information regarding the free-space regions as well as a lower hierarchical block of management information regarding the delete is deleted in response to the delete.

10. The file processing device of claim 1, wherein the initial regions are regions in which sound data for post recording is recorded.

11. The file processing device of claim 1, wherein the management information have an identifier for specifying data recorded in the initial regions.

12. The file processing device of claim 1, wherein the management information have information for showing the number of files that refer to data recorded in the initial regions.

13. The file processing device of claim 1, wherein the management information have information for showing sizes of the space regions in the initial regions.

14. A file processing device comprising:
a processor;
a memory device storing instructions which when executed by the processor, cause the processor to:
(a) record, on a recording medium, a file which is formed of:
(i) a real data block, in which a plurality of real data are integrated; and
(ii) a management information block in which a plurality of management information of the real data including at least information necessary to reproduce the real data allocated to the real data block are integrated in a hierarchical structure;

(b) record the real data block on the recording medium by sequentially, cyclically, and repeatedly recording the plurality of real data as well as by recording, in the real data block, management information regarding allocation to a real data side for managing predetermined real data continuously recorded on the recording medium.

15. The file processing device of claim 14, wherein the management information is information for specifying the predetermined real data.

16. A method of operating a file processing device including: (a) a processor; and (b) a memory device storing instructions, the method comprising:
(a) causing the processor to execute the instruction to record, on a recording medium, a file which has a format in which a plurality of real data are allocated, said real data including a plurality of management information, said file being formed of:
(i) a real data block in which the real data are integrated; and
(ii) a management information block, in which the plurality of management information of the real data including at least information necessary to reproduce the real data allocated to the real data block are integrated in a hierarchical structure;
(b) causing the processor to execute the instruction to record the real data block on the recording medium by intermittently reserving initial regions composed of free-space regions on the recording medium and recording, in the real data block, management information of the initial regions regarding allocation to the real data for managing each of the initial regions after the real data are recorded; and
(c) causing the processor to execute the instruction to record the management information block on the recording medium by recording a lower hierarchical block of management information corresponding to each of the real data and a lower hierarchical block composed of management information regarding the free-space regions in the initial regions which correspond to the above lower hierarchical block.

17. The method of claim 16, which includes:
(a) causing the processor to execute the instruction to record desired data in the initial regions by managing the initial regions based on the management information of the initial regions regarding the allocation to a real data side and on the management information by the lower hierarchical block that belongs to the initial regions; and
(b) causing the processor to execute the instruction to update the management information of the initial regions regarding the allocation to the real data side and the management information of the lower hierarchical block regarding the free-space regions in response to the record of the desired data as well as forming the lower hierarchical block corresponding to the record of the desired data to the management information block.

18. A method of operating a file processing device including: (a) a processor; and (b) a memory device storing instructions, the method comprising:
(a) causing the processor to execute the instruction to record, on a recording medium, a file formed of:
(i) a real data block in which a plurality of real data are integrated; and
(ii) a management information block in which a plurality of management information of the real data including at least information necessary to reproduce the real data allocated to the real data block are integrated in a hierarchical structure;
(b) causing the processor to execute the instruction to record the real data block on the recording medium by sequentially, cyclically, and repeatedly recording the plurality of real data as well as by recording, in the real data block, management information regarding allocation to a real data side for managing predetermined real data continuously recorded on the recording medium.

19. A non-transitory computer readable medium storing instruction structured to cause a file processing device to:
(a) record, on a recording medium, a file which has a format in which a plurality of real data are allocated, said real data including a plurality of management information, said file being formed of:
(i) a real data block in which the real data are integrated; and
(ii) a management information block in which the plurality of management information of the real data including at least information necessary to reproduce the real data allocated to the real data block are integrated in a hierarchical structure;
(b) record the real data block on a recording medium by intermittently reserving initial regions composed of free-space regions on the recording medium and recording, in the real data block, management information of the initial regions regarding allocation to the real data for managing each of the initial regions after the real data are recorded; and
(c) record the management information block on the recording medium by recording a lower hierarchical block of management information corresponding to each of the real data and a lower hierarchical block composed of management information regarding the free-space regions in the initial regions which correspond to the above lower hierarchical block.

20. A non-transitory computer readable medium storing instructions structured to cause a file processing device to:
(a) record, on a recording medium, a file formed of:
(i) a real data block in which a plurality of real data are integrated; and
(ii) a management information block in which a plurality of management information of the real data including at least information necessary to reproduce the real data allocated to the real data block are integrated in a hierarchical structure;
(b) record the real data block on a recording medium by sequentially, cyclically, and repeatedly recording the plurality of real data as well as by recording, in the real data block, management information regarding allocation to a real data side for managing predetermined real data continuously recorded on the recording medium.

21. An imaging device comprising:
a processor;
a memory device storing instructions which when executed by the processor, cause the processor to:
(a) record real data composed of video data and sound data obtained as a result of imaging on a recording medium;
(b) record a real data block in which the real data are integrated on the recording medium by intermittently reserving initial regions composed of free-space regions on the recording medium;
(c) record, in the real data block, management information of the initial regions regarding allocation to the real data for managing each of the initial regions after the real data are recorded; and
(d) subsequently record a block which has a hierarchical structure and includes management information necessary to process the video data, the sound data, and the initial regions, on the recording medium by allocating management information, which corresponds the video data, the sound data, and the initial regions, respectively, to a lower hierarchical block.

22. The file processing device of claim 1, wherein the real data block and the management information block are at the same hierarchal level.

23. The file processing device of claim 14, wherein the real data block and the management information block are at the same hierarchal level.

* * * * *